(12) United States Patent
Giombanco et al.

(10) Patent No.: US 8,325,502 B2
(45) Date of Patent: Dec. 4, 2012

(54) SELF-SUPPLY CIRCUIT AND METHOD FOR A VOLTAGE CONVERTER

(75) Inventors: Salvatore Giombanco, Cassaro (IT); Salvatore Tumminaro, Marianopoli (IT)

(73) Assignee: STMicroelectronincs S.r.l., Agrate Brianza (IT)

( * ) Notice: Subject to any disclaimer, the term of this patent is extended or adjusted under 35 U.S.C. 154(b) by 925 days.

(21) Appl. No.: 12/324,548

(22) Filed: Nov. 26, 2008

(65) Prior Publication Data

US 2009/0140712 A1    Jun. 4, 2009

(30) Foreign Application Priority Data

Nov. 29, 2007    (IT) ............................... TO2007A0860

(51) Int. Cl.
*H02M 1/00*    (2007.01)
*H02M 1/36*    (2007.01)
(52) U.S. Cl. ..................... 363/49; 363/21.08; 363/21.16
(58) Field of Classification Search ............... 363/21.04, 363/21.08, 21.12, 21.16, 49; 323/282
See application file for complete search history.

(56) References Cited

U.S. PATENT DOCUMENTS

| | | | |
|---|---|---|---|
| 4,975,823 A | 12/1990 | Rilly et al. | |
| 5,783,962 A * | 7/1998 | Rieger | 327/390 |
| 5,874,841 A | 2/1999 | Majid et al. | |
| 5,978,241 A | 11/1999 | Lee | |
| 5,982,640 A | 11/1999 | Majid et al. | |
| 6,011,414 A | 1/2000 | Majid et al. | |
| 6,122,180 A | 9/2000 | Seo et al. | |
| 6,445,598 B1 | 9/2002 | Yamada | |
| 6,894,910 B1 | 5/2005 | Wu | |
| 6,990,000 B1 | 1/2006 | Rodriguez et al. | |
| 7,525,819 B2 * | 4/2009 | Choi | 363/16 |
| 7,545,657 B2 * | 6/2009 | Shimada et al. | 363/49 |
| 7,561,446 B1 | 7/2009 | Vinciarelli | |
| 7,719,860 B2 * | 5/2010 | Usui | 363/21.12 |
| 7,859,859 B2 | 12/2010 | Clarkin | |

(Continued)

FOREIGN PATENT DOCUMENTS

CN    1826720 A    8/2006

(Continued)

OTHER PUBLICATIONS

European Search Report for European Application No. EP08170303, European Patent Office, Munich, Oct. 18, 2010, pp. 3.

(Continued)

*Primary Examiner* — Jue Zhang
*Assistant Examiner* — Fred E Finch, III
(74) *Attorney, Agent, or Firm* — Graybeal Jackson LLP

(57) ABSTRACT

An embodiment of a self-supply circuit, for a voltage converter that converts an input voltage into an output voltage and has a main switch and a controller, designed to control switching of the main switch for controlling the output voltage; the self-supply circuit is provided with: a charge accumulator, which is connected to the controller and supplies a self-supply voltage to the same controller; a generator, which supplies a charge current to the charge accumulator; and an auxiliary switch, which has a first conduction terminal in common with a respective conduction terminal of the main switch and is operable so as to control transfer of the charge current to the charge accumulator. In particular, the self-supply circuit is provided with a precharge stage, connected to the auxiliary switch, which carries out a precharging of an intrinsic capacitance of the auxiliary switch before a turning-off transient of the main switch ends.

6 Claims, 8 Drawing Sheets

U.S. PATENT DOCUMENTS

| | | | |
|---|---|---|---|
| 2001/0033498 A1 | 10/2001 | Lee | |
| 2001/0033501 A1* | 10/2001 | Nebrigic | 363/49 |
| 2003/0001548 A1 | 1/2003 | Feldtkeller | |
| 2003/0206425 A1 | 11/2003 | Zhang | |
| 2004/0080962 A1 | 4/2004 | Charych | |
| 2004/0257839 A1 | 12/2004 | Yang et al. | |
| 2005/0073862 A1 | 4/2005 | Mednik et al. | |
| 2006/0050539 A1 | 3/2006 | Yang et al. | |
| 2006/0152951 A1 | 7/2006 | Fagnani et al. | |
| 2006/0209571 A1 | 9/2006 | Aso et al. | |
| 2006/0250824 A1 | 11/2006 | Wekhande et al. | |
| 2007/0047269 A1* | 3/2007 | Hachiya | 363/21.17 |
| 2008/0104432 A1* | 5/2008 | Vinayak et al. | 713/300 |
| 2009/0086513 A1 | 4/2009 | Lombardo et al. | |
| 2009/0141520 A1 | 6/2009 | Grande et al. | |
| 2009/0147546 A1 | 6/2009 | Grande et al. | |
| 2009/0175057 A1 | 7/2009 | Grande et al. | |

FOREIGN PATENT DOCUMENTS

| | | |
|---|---|---|
| CN | 1848641 A | 10/2006 |
| CN | 1937379 A | 3/2007 |

OTHER PUBLICATIONS

CN 200810246381.6; State Intellectual Property Office of People's Republic of China Search Report, Dated Jul. 23, 2012.

* cited by examiner

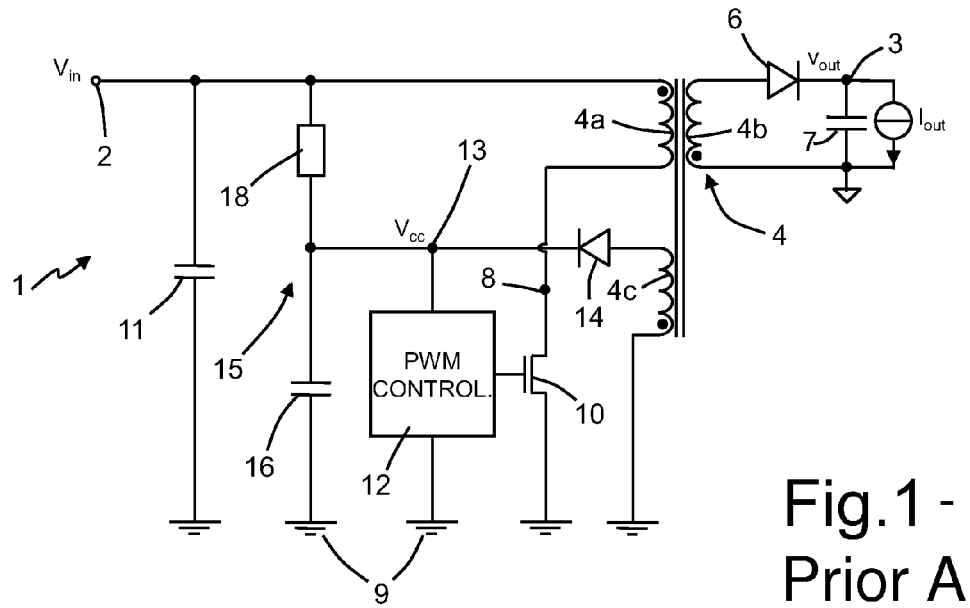
Fig.1 - Prior Art
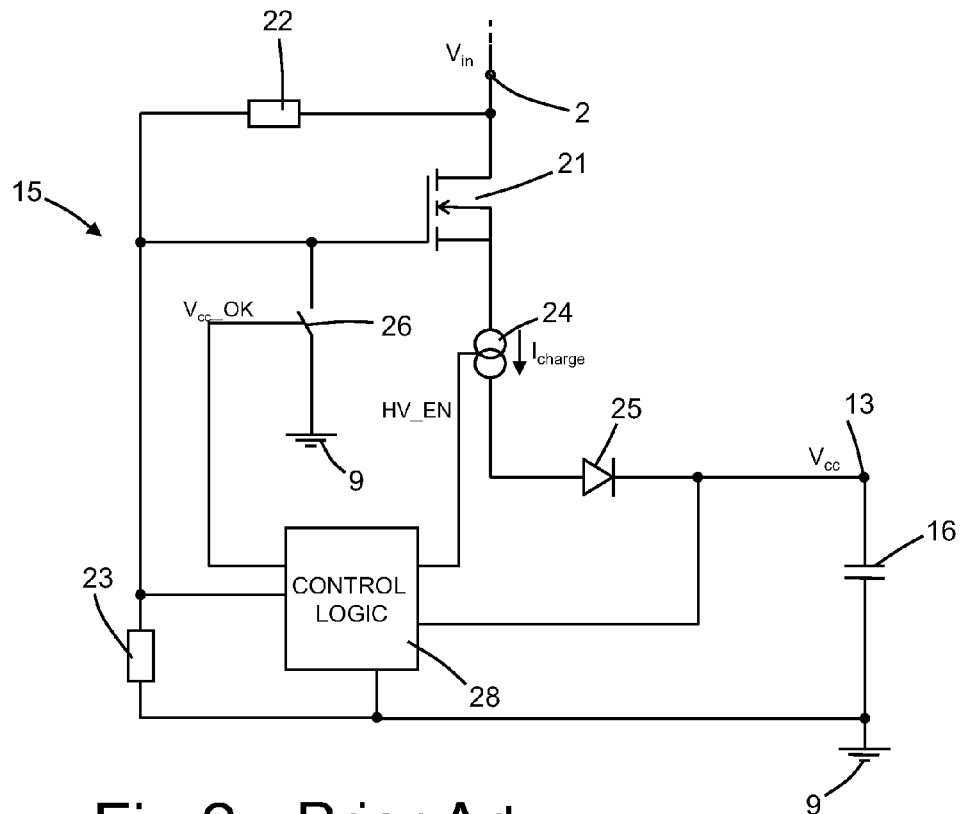
Fig.2 - Prior Art

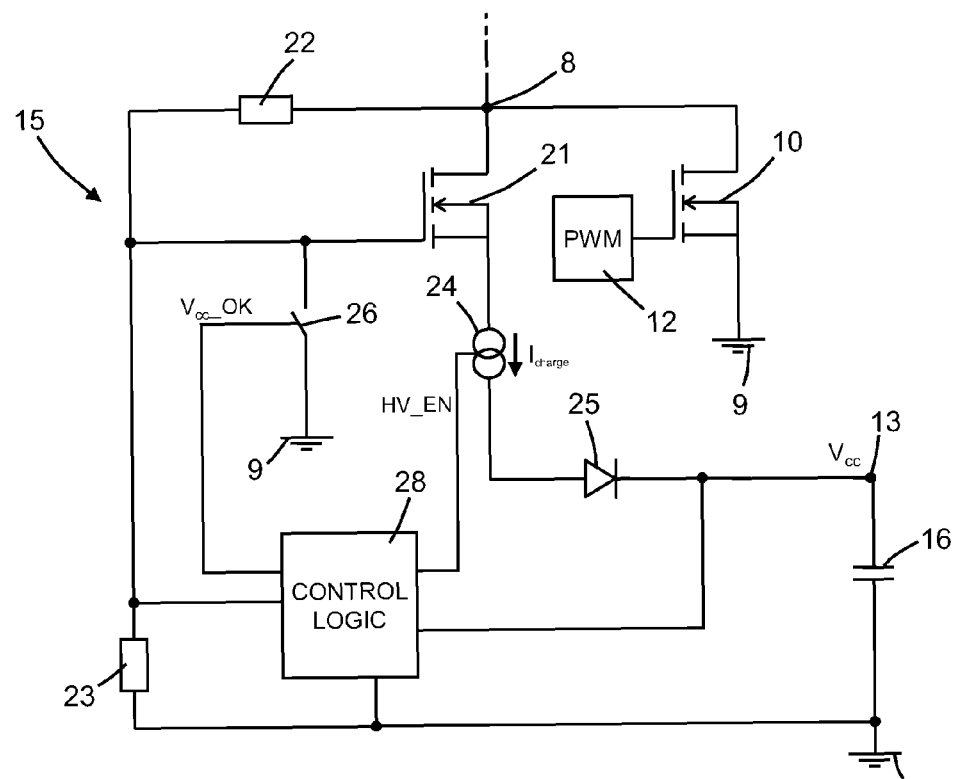
Fig.3 - Prior Art
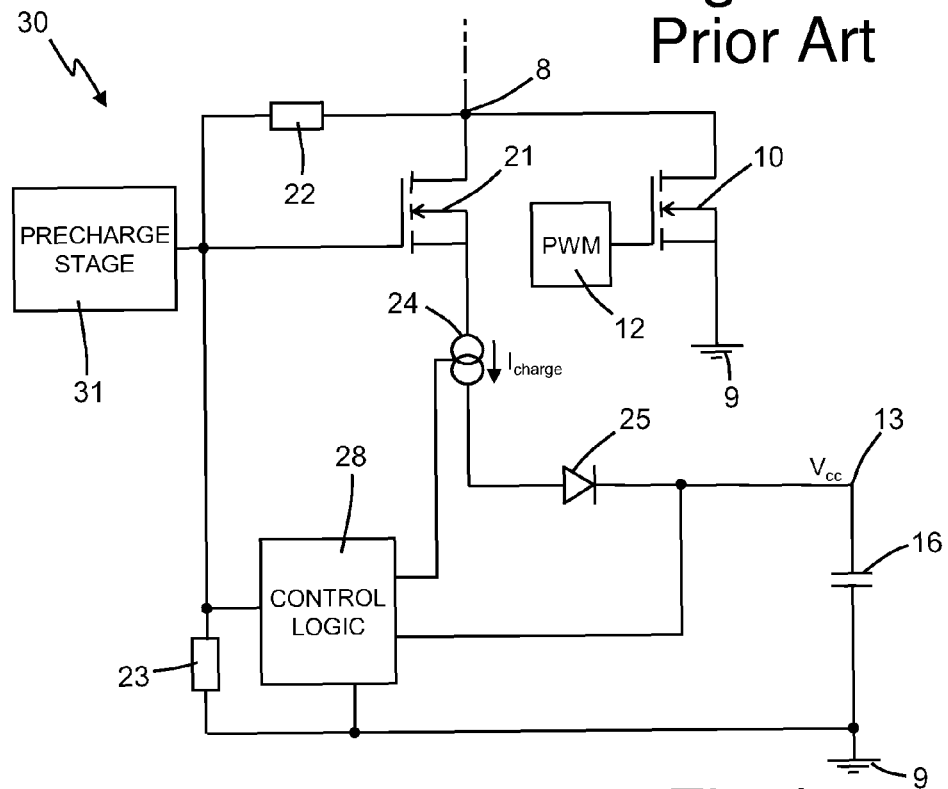
Fig.4

US 8,325,502 B2

SELF-SUPPLY CIRCUIT AND METHOD FOR A VOLTAGE CONVERTER

PRIORITY CLAIM

The present application claims the benefit of Italian Patent Application Serial No.: TO2007A000860, filed Nov. 29, 2007, which application is incorporated herein by reference in its entirety.

RELATED APPLICATION DATA

This application is related to the U.S. patent application Ser. No. 12/324,194 entitled ISOLATED VOLTAGE CONVERTER WITH FEEDBACK ON THE PRIMARY WINDING, AND CORRESPONDING METHOD FOR CONTROLLING THE OUTPUT VOLTAGE, filed Nov. 26, 2008, application Ser. No. 12/324,062 entitled ISOLATED VOLTAGE CONVERTER WITH FEEDBACK ON THE PRIMARY WINDING, AND CORRESPONDING METHOD FOR CONTROLLING THE OUTPUT VOLTAGE, filed Nov. 26, 2008 and application Ser. No. 12/324,412 entitled ISOLATED VOLTAGE CONVERTER WITH FEEDBACK ON THE PRIMARY WINDING AND PASSIVE SNUBBER NETWORK, AND CORRESPONDING CONTROL METHOD, filed Nov. 26, 2008 and which are incorporated herein by reference in their entireties.

TECHNICAL FIELD

An embodiment of the present disclosure relates to a self-supply circuit and method for a voltage converter, and more precisely for a switched-mode voltage converter, controlled in pulse-width modulation (PWM).

BACKGROUND

As is known, switched-mode voltage converters, which are preferred for their high efficiency and their reduced size as compared to classic linear converters, usually implement a self-supply technique that enables, starting from non-regulated input voltages, regulated output voltages to be obtained having an amplitude greater or smaller than the input voltage.

One of the most common types of switched-mode voltage converters is the isolated accumulation ("flyback") type. A flyback voltage converter enables conversion of a first voltage value (present on an input of the converter) into a second voltage value (supplied on the output of the converter), maintaining the input and output of the converter galvanically isolated by the use of a transformer.

FIG. 1 shows a circuit diagram of a known voltage converter 1, of a flyback type.

The voltage converter 1 has an input 2 to which an input voltage $V_{in}$ (for example, supplied by a rectifier circuit, not illustrated, starting from the mains voltage) is applied, and an output 3 supplying an output voltage $V_{out}$, and comprises a transformer 4, having a primary side and a secondary side, which is electrically isolated from the primary side. In particular, the transformer 4 has a primary winding 4a coupled to the input 2, a secondary winding 4b coupled to the output 3 by interposition of a first diode 6, and an auxiliary winding 4c (the latter set on the primary side of the transformer 4). An output capacitor 7 is coupled to the output 3. A main transistor 10, in particular an N-channel MOS transistor, is coupled between an internal node 8, which is in turn coupled to the primary winding 4a, and a reference terminal 9 (for example, a ground terminal). A bulk capacitor 11 is coupled between the input 2 and the reference terminal 9.

The voltage converter 1 further comprises: a PWM controller 12, used for regulation of the output voltage $V_{out}$, having a supply terminal 13, which receives a supply voltage $V_{cc}$ and is coupled to the auxiliary winding 4c via the interposition of a second diode 14, and an output terminal, which is coupled to the gate terminal of the main transistor 10 and supplies a PWM signal for controlling opening and closing of the main transistor 10; and a self-supply circuit 15, having an input terminal coupled to the input 2 of the voltage converter 1, and an output terminal, which coincides with the supply terminal 13 of the PWM controller 12 and supplies the supply voltage $V_{cc}$.

In detail, the self-supply circuit 15 comprises: an accumulation capacitor 16, coupled between the supply terminal 13 and the reference terminal 9; and a start-up resistor 18 coupled between the input terminal 2 of the voltage converter and the supply terminal 13.

In a known way, the function of the self-supply circuit 15 is that of supplying the PWM controller 12 to enable it to regulate the output voltage $V_{out}$. In use, the accumulation capacitor 16 is initially charged by the input voltage $V_{in}$, through the start-up resistor 18. The PWM controller 12 switches on when the value of the voltage on the accumulation capacitor 16 reaches a first threshold value $V_{ccon}$, for example, equal to 13.5 V. Next, the PWM controller 12 receives the supply voltage $V_{cc}$ directly from the auxiliary winding 4c of the transformer 4.

The start-up resistor 18 is used in the initial turn-on phase (start-up) of the voltage converter 1 for supplying the turn-on supply to the PWM controller 12. However, a current flows through the start-up resistor 18 also at the end of the initial start-up phase, causing a considerable dissipation of power and reducing the efficiency of the voltage converter 1.

In addition, if the converter is used for regulating also an output current $I_{out}$, for example as a battery-charger, the auxiliary winding 4c is also used (in a known way that is not described in detail herein) for supplying a feedback signal to the PWM controller 12, for regulating both the output voltage $V_{out}$ and the output current $I_{out}$. In this case, the voltage on the auxiliary winding 4c might not have a value sufficient for supplying the PWM controller 12. Consequently, also during the switching phase in which the PWM controller 12 is active, the PWM controller 12 is self-supplied through the start-up resistor 18, thus increasing the total power dissipation.

FIG. 2 shows a different circuit embodiment of the self-supply circuit 15 of the voltage converter 1 (the remaining elements of the voltage converter, which are present also in this embodiment, are not illustrated again here for clarity reasons).

In detail, the self-supply circuit 15 comprises: the accumulation capacitor 16 (previously described); an auxiliary transistor 21, in particular an N-channel MOS transistor having a drain terminal coupled to the input 2 of the voltage converter 1 and receiving the input voltage $V_{in}$; a first biasing resistor 22, having, for example, a value of resistance of 15 MΩ and coupled between the input 2 of the voltage converter 1 and the gate terminal of the auxiliary transistor 21; a second biasing resistor 23, coupled between the gate terminal of the auxiliary transistor 21 and the reference terminal 9; a current generator 24, which is coupled between the source terminal of the auxiliary transistor 21 and the supply terminal 13 of the PWM controller 12, via the interposition of a third diode 25, and has a control terminal; and a switch 26, coupled between the gate terminal of the auxiliary transistor 21 and the reference terminal 9.

The self-supply circuit 15 further comprises a control logic 28, having a first input coupled to the gate terminal of the auxiliary transistor 21, a second input coupled to the supply terminal 13, a first output supplying a control signal $V_{cc\_OK}$ to a control terminal of the switch 26, and a second output supplying to the control terminal of the current generator 24 an activation signal HV_EN.

In use, during a start-up phase, when the input voltage $V_{in}$ (following upon progressive charging of the bulk capacitor 11, shown in FIG. 1) reaches a given threshold value, for example, equal to 80 V, the control logic 28 turns on the current generator 24 via the activation signal HV_EN, enabling a current $I_{charge}$ to flow through the auxiliary transistor 21. This current $I_{charge}$, for example, having a value of 1 mA, charges the accumulation capacitor 16, raising the supply voltage $V_{cc}$ across its terminals in a substantially linear way. When the supply voltage $V_{cc}$ reaches the first threshold value $V_{ccon}$, the signal $V_{cc\_OK}$ generated by the control logic 28 closes the switch 26, causing turning-off of the auxiliary transistor 21 and interruption of the flow of current $I_{charge}$ through the same auxiliary transistor 21 and the current generator 24. The PWM controller 12 (FIG. 1) is then supplied by the energy stored in the accumulation capacitor 16, as long as the auxiliary winding 4c generates a voltage sufficiently high to sustain the operations of regulation of the controller.

The residual consumption of the self-supply circuit 15 is hence due only to the presence of the first biasing resistor 22, and is typically from 50 to 70 times lower than that of the circuit of FIG. 1.

The self-supply circuit 15 also intervenes for charging the accumulation capacitor 16 during the switching phase of the main transistor 10 (FIG. 1), in the case where the voltage on the auxiliary winding is not sufficient to supply the supply voltage $V_{cc}$, for example, in the case of operation as a battery-charger, when the battery is run down or in the presence of overload at the output. In detail, as soon as the supply voltage $V_{cc}$ drops below a second threshold value $V_{ccrestart}$, for example, equal to 10.5 V, the control logic 28 controls opening of the switch 26 by means of the signal $V_{cc\_OK}$, and enables the current generator 24 by means of the signal HV_EN so as to charge the accumulation capacitor 16 via the current $I_{charge}$.

In order to contain costs, it is possible to integrate in one and the same chip (not illustrated) the auxiliary transistor 21 and the main transistor 10. In this case, as shown in FIG. 3, the auxiliary transistor 21 and the main transistor 10 share the drain terminal. The drain terminal is coupled to the internal node 8 (FIG. 1), which is in turn coupled to the primary winding 4a of the transformer 4, and is at a voltage which is not constant (i.e., which switches between a value of approximately 0 V and the value of the input voltage $V_{in}$).

The self-supply circuit 15 of FIG. 3 thus enables charging of the accumulation capacitor 16 only when the main transistor 10 is turned off, i.e., when the voltage of the aforesaid drain terminal (or, in a similar way of the internal node 8) is high and equal to the value of the input voltage $V_{in}$. Consequently, in the case where the self-supply circuit 15 is also used for self-supply of the PWM controller 12 through the accumulation capacitor 16 during the switching phase of the PWM controller 12, the current $I_{charge}$ can charge the accumulation capacitor 16 only during the OFF phase of the switching period, when the voltage of the drain terminal is high. This condition can jeopardize proper operation of the self-supply circuit 15, especially for high values of duty cycle (higher than 50%) of the switching signal that regulates operation of the voltage converter 1, and consequently considerably limits the maximum value of duty cycle that can be obtained.

In fact, the auxiliary transistor 21 should be able to turn on rapidly during turning-off of the main transistor 10 in order to maximize the useful time (substantially corresponding to the OFF phase of the switching signal) for charging the accumulation capacitor 16. However, the switching rate of the auxiliary transistor 21 is limited by the gate capacitance of the latter and by the presence of the first biasing resistor 22, the value of which is commonly chosen high (for example, equal to 15 MΩ) in order to minimize the losses.

In use, when the main transistor 10 is turned on, the voltage on the internal node 8 is approximately 0 V and the auxiliary transistor 21 is off. When the main transistor 10 is turned off, the signal $V_{cc\_OK}$ generated by the control logic 28 controls opening of the switch 26, the voltage on the drain terminal of the auxiliary transistor 21 starts to increase, and the gate capacitor of the same auxiliary transistor 21 is charged, first by the injection of charge coming from the capacitance between the drain and gate terminals and then, when the voltage on the drain terminal reaches a sufficiently high value, through the biasing resistor 22. Both of these contributions of charge may not be, however, sufficient to turn on the auxiliary transistor 21 completely, and to supply the current $I_{charge}$ required by the current generator 24, in a reasonable time. Consequently, a substantial part of the time available for charging the accumulation capacitor 16 may not be exploited. Therefore, in order to guarantee in any case the self-supply operation, it is hence common to limit the duty cycle to a value lower than 50%, for example equal to 45%.

SUMMARY

Embodiments of the present disclosure include a self-supply circuit and method that will be free from the drawbacks described above, and in particular that will enable self-supply to be guaranteed in a voltage converter without setting any limitations on the duty cycle.

BRIEF DESCRIPTION OF THE DRAWINGS

One or more embodiments of the disclosure are now described, purely by way of non-limiting example and with reference to the attached drawings, wherein:

FIG. 1 shows a circuit diagram of a flyback voltage converter of a known type;

FIG. 2 shows a circuit diagram of a self-supply circuit of the voltage converter of FIG. 1;

FIG. 3 shows a different circuit diagram, of a known type, of the self-supply circuit;

FIG. 4 shows part of a circuit diagram of a voltage converter with highlighted therein a self-supply circuit, made according to an embodiment of the present disclosure;

DETAILED DESCRIPTION

Figure 5:
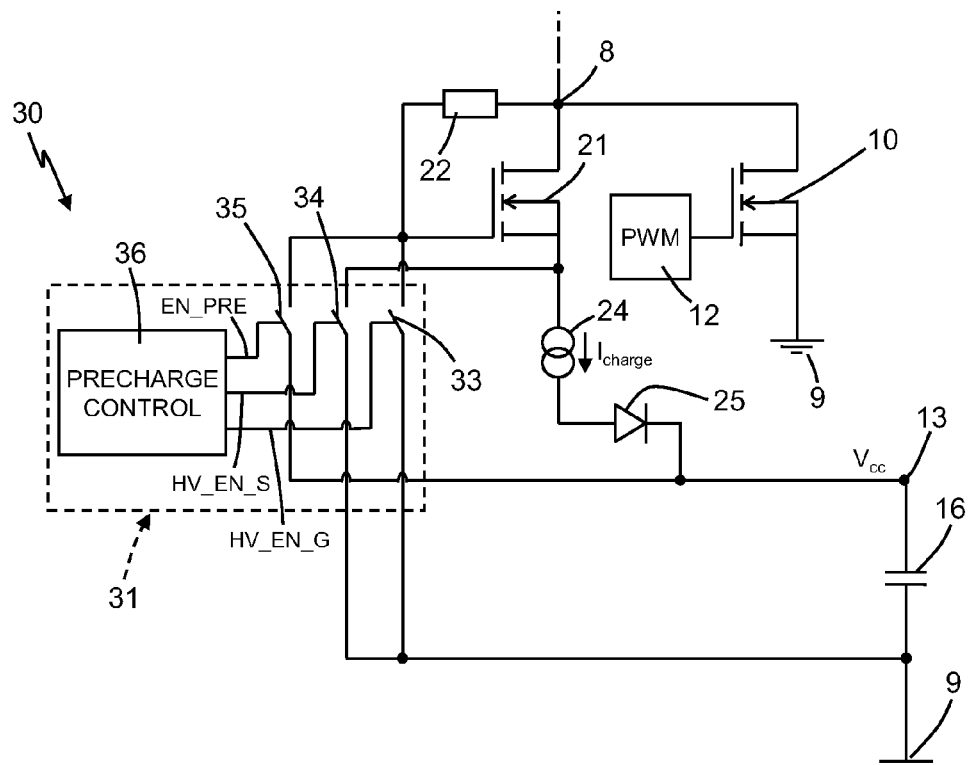
FIG. 5 shows a possible circuit embodiment of a precharge stage within the self-supply circuit of FIG. 4.

FIG. 4 shows a self-supply circuit 30, made according to an embodiment of the present disclosure. Elements that have already been described with reference to the known art are designated by the same reference numbers and are not described again. In particular, the self-supply circuit 30 may find use in a voltage converter 1 of the type described with reference to FIG. 1 (not illustrated in FIG. 4).

In detail, the self-supply circuit 30 differs from the one described in FIG. 3, in so far as it comprises a precharge stage 31 coupled (in this embodiment coupled) directly to the gate terminal of the auxiliary transistor 21. In particular, it should be noted that, even though they are not described again in detail, the second biasing resistor 23 and the control logic 28 are present (for greater clarity, these elements are not shown again in the subsequent figures).

The precharge stage 31 enables a rapid switching of the auxiliary transistor 21 to be obtained during each switching cycle, in so far as it has the function of precharging the capacitance between the gate and source terminals of the auxiliary transistor 21, whilst the voltage on the drain terminal is still at a low value, during or at the end of the turning-on phase (ON phase of the switching period) of the main transistor 10. In this way, following upon turning-off of the main transistor 10, when the voltage present on the internal node 8 starts to increase, the auxiliary transistor 21 is already turned on, and the current generator 24 can generate the current $I_{charge}$ for charging the accumulation capacitor 16 without appreciable time delays. It should be noted that the precharge stage 31 has also the function of controlling turning-off of the auxiliary transistor 21 in order to interrupt the flow of the current $I_{charge}$.

In particular, the value of the current $I_{charge}$ generated by the current generator 24 is determined as a function of the maximum duty cycle $D_{max}$ of the switching signal, and of the current consumption $I_{cons}$ of the voltage converter 1, and must satisfy the following condition:

$$I_{charge} > \frac{I_{cons}}{1 - D_{max}}$$

When this relation is satisfied, the self-supply operation is carried out without limiting the duty cycle of the switching signal.

In fact, the average charge current of the accumulation capacitor 16 is $$I_{average} = I_{charge} \cdot D_{aux}$$

where $D_{aux}$ is the duty-cycle of the current $I_{charge}$, i.e., the ratio between the time used for charging the accumulation capacitor 16 and the switching period. Since, as discussed previously, charging of the accumulation capacitor 16 is enabled when the main transistor is turned off we have:

$$D_{aux} = 1 - D_{max}$$

The average current $I_{average}$ is such as to charge the accumulation capacitor 16 and simultaneously sustain the consumption of the PWM controller 12. Consequently, in order for this to occur, the following expression (wherefrom the aforesaid condition derives) holds:

$$I_{average} = (1 - D_{max}) \cdot I_{charge} > I_{cons}$$

As shown in FIG. 5, in a possible embodiment, the precharge stage 31 comprises: a first precharge switch 33, coupled between the gate terminal of the auxiliary transistor 21 and the reference terminal 9; a second precharge switch 34, coupled between the source terminal of the auxiliary transistor 21 and the reference terminal 9; a third precharge switch 35, coupled between the gate terminal of the auxiliary transistor 21 and the supply terminal 13 of the PWM controller 12 (and hence to the accumulation capacitor 16); and a precharge control block 36, designed to generate respective control signals for the first, second, and third precharge switches 33, 34, 35 such as to implement self-supply management. In detail, the first precharge switch 33 is controlled in opening and closing by a logic signal HV_EN_G, the second precharge switch 34 is controlled in opening and closing by a logic signal HV_EN_S, and the third precharge switch 35 is controlled in opening and closing by a logic signal EN_PRE.

In particular, when the current generator 24 is disabled (during the ON phase of the switching period of the main transistor 10), the first and second precharge switches 33, 34 are closed (signals HV_EN_G and HV_EN_S high), and the third precharge switch 35 is open (signal EN_PRE low), thus connecting the source and gate terminals of the auxiliary transistor 21 to the reference terminal 9. At the end of the ON phase of switching of the main transistor 10 (as will be clarified hereinafter), the first precharge switch 33 is controlled in opening (signal HV_EN_G low), whilst the second and third precharge switches 34, 35 are controlled in closing (signals HV_EN_S and EN_PRE high). In this way, the source terminal of the auxiliary transistor 21 is coupled to the reference terminal 9, and the gate terminal directly to the supply voltage $V_{cc}$, thus starting precharging of the gate-source capacitance of the auxiliary transistor 21 to the supply voltage $V_{cc}$.

Before the voltage on the drain terminal of the auxiliary transistor 21 starts to increase, or at the moment in which the same voltage starts to increase, the second and third precharge switches 34, 35 are controlled in opening (signals HV_EN_S and EN_PRE low), given that the precharging phase can be considered completed. It should be noted that the auxiliary transistor 21, in this situation, is already turned on, and the charge current $I_{charge}$ can immediately flow (as soon as the voltage at the internal node 8 becomes high) through the current generator 24, thus charging the accumulation capacitor 16 so that the entire OFF phase of the switching signal is exploited.

Figure 6:
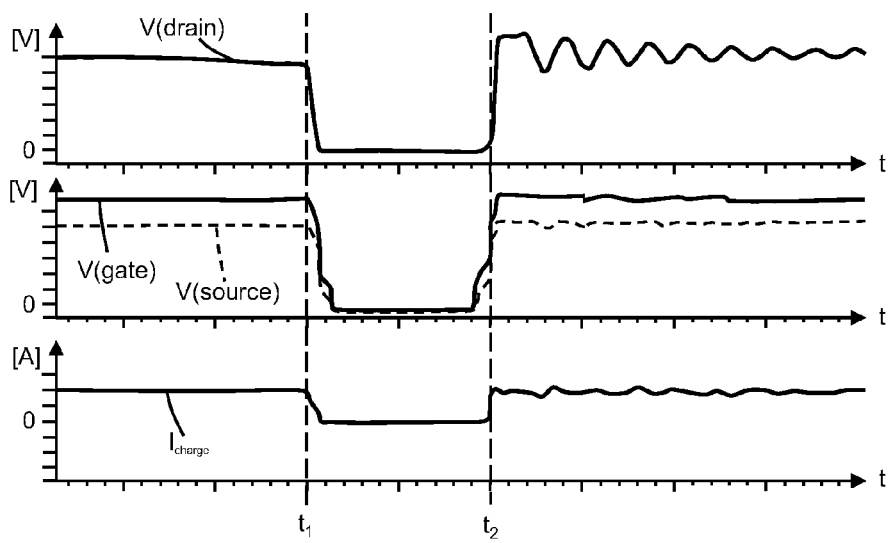
FIGS. 6 and 7 show the plots in time of the waveforms of electrical signals involved during a precharge step in the voltage converter of FIG. 4.

FIG. 6 shows the waveforms of the voltage on the drain terminal, designated by $V_{(drain)}$, on the gate terminal, designated by $V_{(gate)}$, and on the source terminal, designated by $V_{(source)}$, of the auxiliary transistor 21, and of the charge current $I_{charge}$. Following the switching of the main transistor 10 (instant of times $t_1$ and $t_2$), the waveform of the current $I_{charge}$ follows the waveform of the voltage on the drain terminal $V_{(drain)}$, responding substantially immediately to its variations, thanks to the precharging phase managed by the precharge stage 31.

Figure 7:
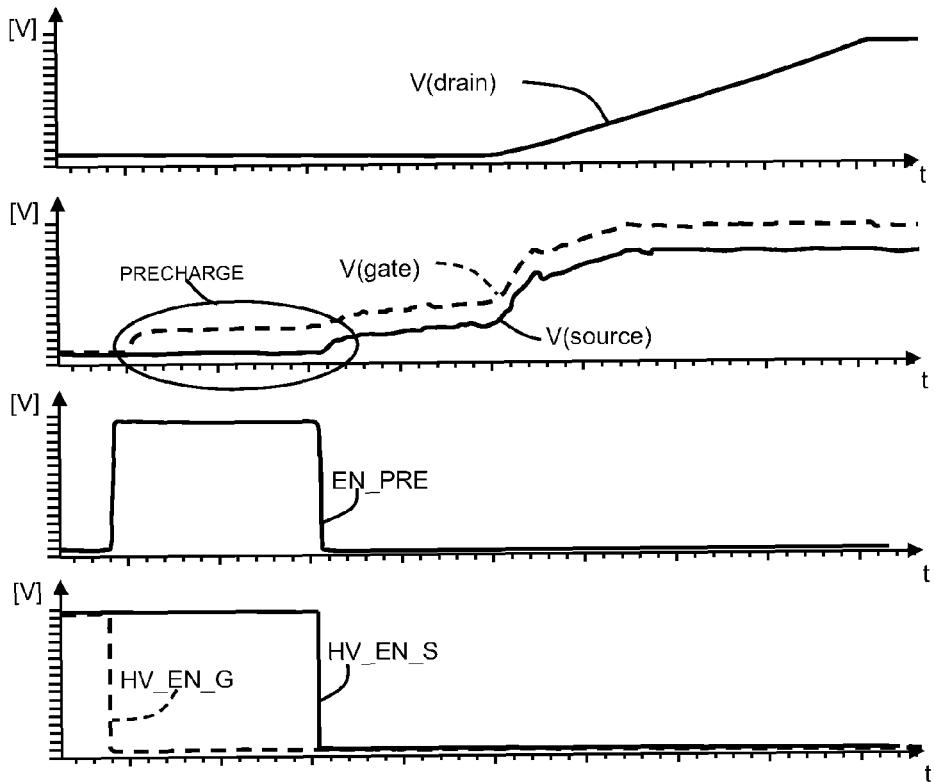

FIG. 7 shows an enlarged portion of the aforesaid waveforms, approximately upon switching at the instant of time $t_2$, together with the plot of the logic signals HV_EN_G, HV_EN_S, and EN_PRE, with highlighted the precharging phase. It should be noted that the voltage on the gate terminal $V_{(gate)}$ starts to rise after switching of the signal EN_PRE to the high value, as a result of the precharging operation.

Figure 8:
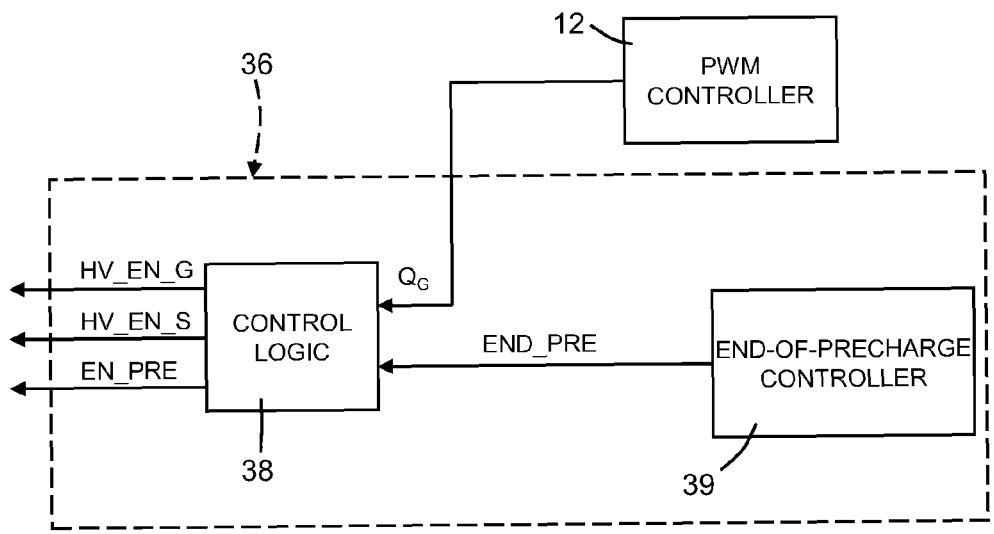
FIG. 8 shows a possible embodiment of a precharge control block inside the precharge stage of FIG. 5.

FIG. 8 shows a possible embodiment of the precharge-control block 36 of the precharge stage 31, which comprises a precharge logic 38, and an end-of-precharge controller 39.

The end-of-precharge controller 39 controls, as will be described in detail hereinafter, the appropriate instant of time at which the precharging phase of the auxiliary transistor 21 stops, generating an end-of-precharge signal END_PRE.

The precharge logic 38 receives at input, from the end-of-precharge controller 39, the end-of-precharge signal END_PRE, and, from the PWM controller 12, a control signal $Q_G$, which is a function of a signal that controls, in a per-se known manner (for example, through a driver), the main transistor 10. The precharge logic 38, according to the end-of-precharge signal END_PRE and to the control signal $Q_G$, generates the logic signals HV_EN_G, HV_EN_S, EN_PRE for management of the precharging phase.

Figure 9:
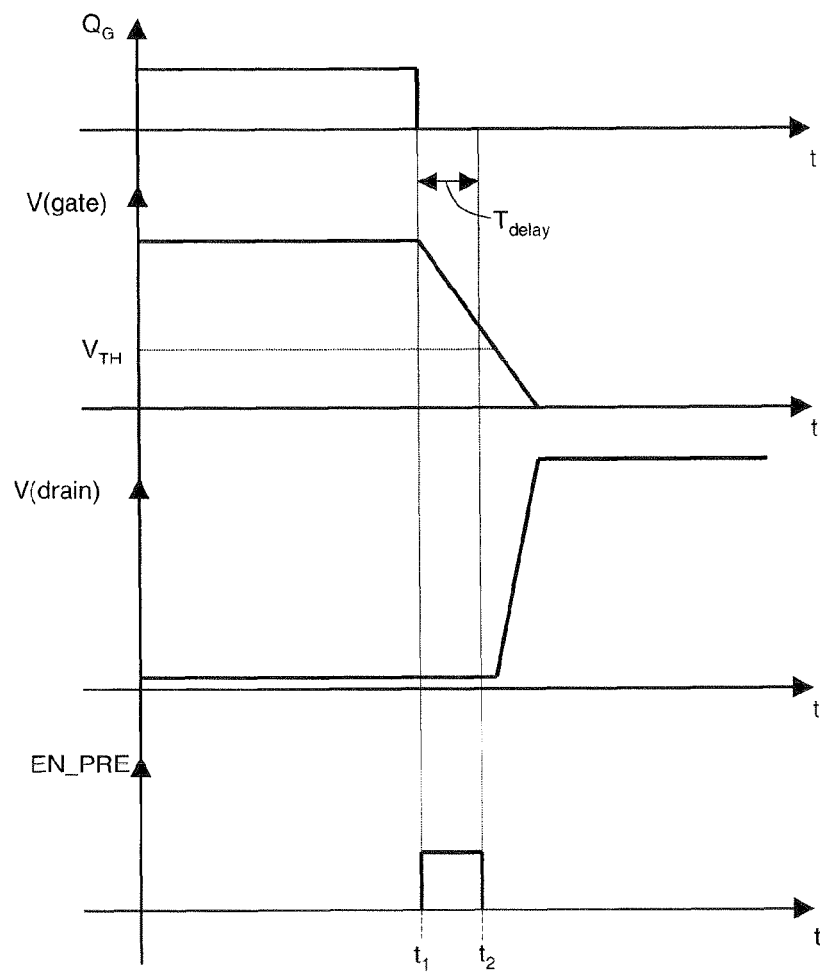
FIG. 9 shows the plots of electrical signals involved during the precharge step.

FIG. 9 shows in detail the plots of the control signal $Q_G$, of the logic signal EN_PRE, of the voltage on the gate terminal $V_{(gate)}$ and of the voltage on the drain terminal $V_{(drain)}$ of the main transistor 10. In detail, when the control signal $Q_G$ is active high, the main transistor 10 is in conduction (the voltage signal on the gate terminal $V_{(gate)}$ is high), whilst the voltage signal on the drain terminal $V_{(drain)}$ and the logic signal EN_PRE have a low value, indicating that the precharging phase has not started yet. As soon as the signal $Q_G$ assumes a low value (instant of time $t_1$), the turning-off transient of the main transistor 10 starts, the voltage signal on the gate terminal $V_{(gate)}$ starts to decrease, and the logic signal EN_PRE assumes a high value, indicating the start of the precharging interval. The precharging phase is disabled by the end-of-precharge controller 39 at the instant of time $t_2$, before or at the end of a delay interval $T_{delay}$ that represents a delay of turning-off of the main transistor 10, after which the voltage signal on the gate terminal $V_{(gate)}$ drops below the threshold voltage $V_{TH}$ of the main transistor 10, and the voltage on the drain terminal $V_{(drain)}$ starts to increase. It is in fact expedient for the precharging phase to terminate before the voltage signal on the drain terminal $V_{(drain)}$ starts to increase so as to prevent the phenomenon of cross-conduction between the drain terminal of the auxiliary transistor 21 and the reference terminal 9.

Figure 10:
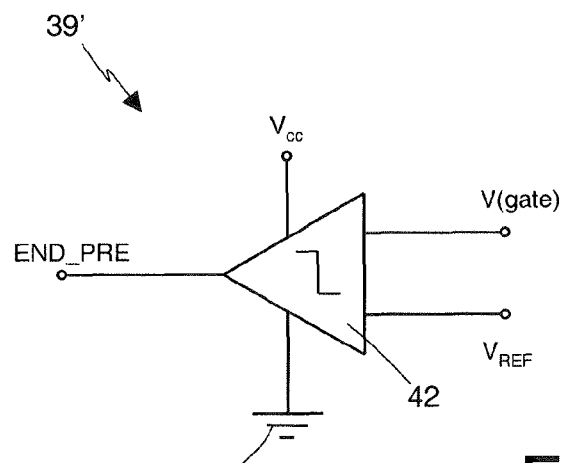
FIG. 10 shows a first embodiment of a portion of the precharge-control block.

As is shown in FIG. 10, in a first embodiment, the end-of-precharge controller, here designated by 39', includes a comparator device 42, which receives on a first input a reference voltage $V_{REF}$, and on a second input the voltage on the gate terminal $V_{(gate)}$ taken on the gate terminal of the main transistor 10, and supplies at output the end-of-precharge signal END_PRE. When the value of the voltage on the gate terminal $V_{(gate)}$ drops below the value of the reference voltage $V_{REF}$, the end-of-precharge signal END_PRE assumes a logic value (for example, high) indicating the end of the precharging interval.

Figure 11:
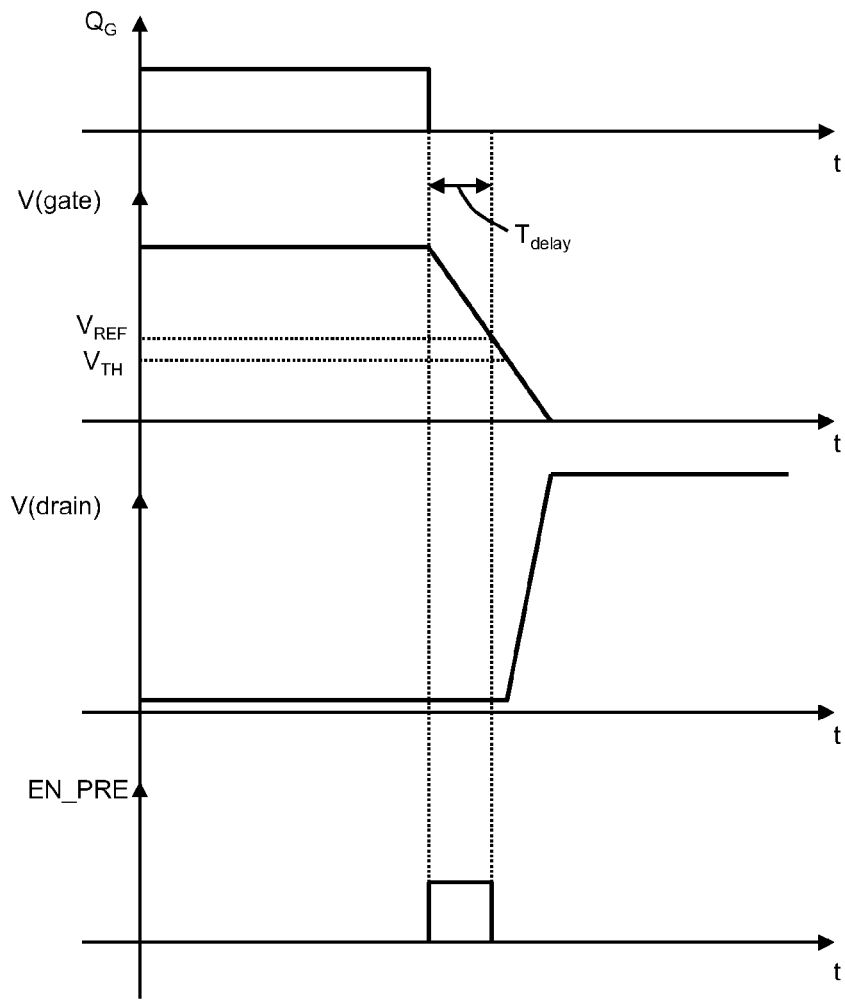
FIG. 11 shows the plots of the signals involved during the precharge step, using the precharge control block of FIG. 10.

As is shown in FIG. 11, the value of the reference voltage $V_{REF}$ may be chosen so as to be higher than the threshold-voltage value $V_{TH}$ of the main transistor 10, given that the voltage on the drain terminal $V_{(drain)}$ starts to increase when the voltage on the gate terminal $V_{(gate)}$ drops below the threshold-voltage value $V_{TH}$.

Figure 12:
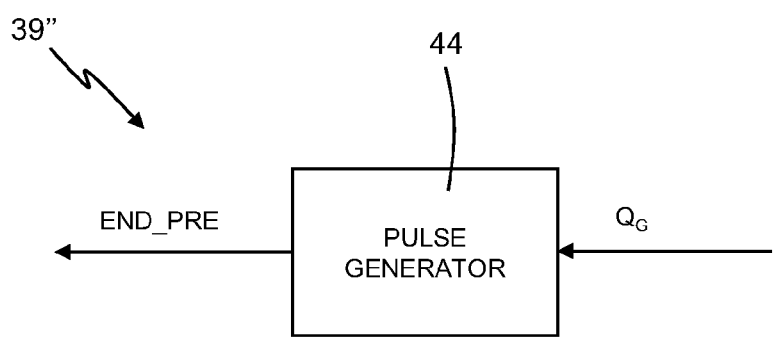
FIG. 12 shows a second embodiment of the precharge control block.

A second embodiment of the end-of-precharge controller, designated by 39'', is shown in FIG. 12. The end-of-precharge controller 39'' comprises in this case a pulse generator 44, which receives on an input thereof the control signal $Q_G$, and generates at output the end-of-precharge signal END_PRE, here of an impulsive type, for example, having a pulse duration $T_{pulse}$ equal to or shorter than the delay interval $T_{delay}$.

Figure 13:
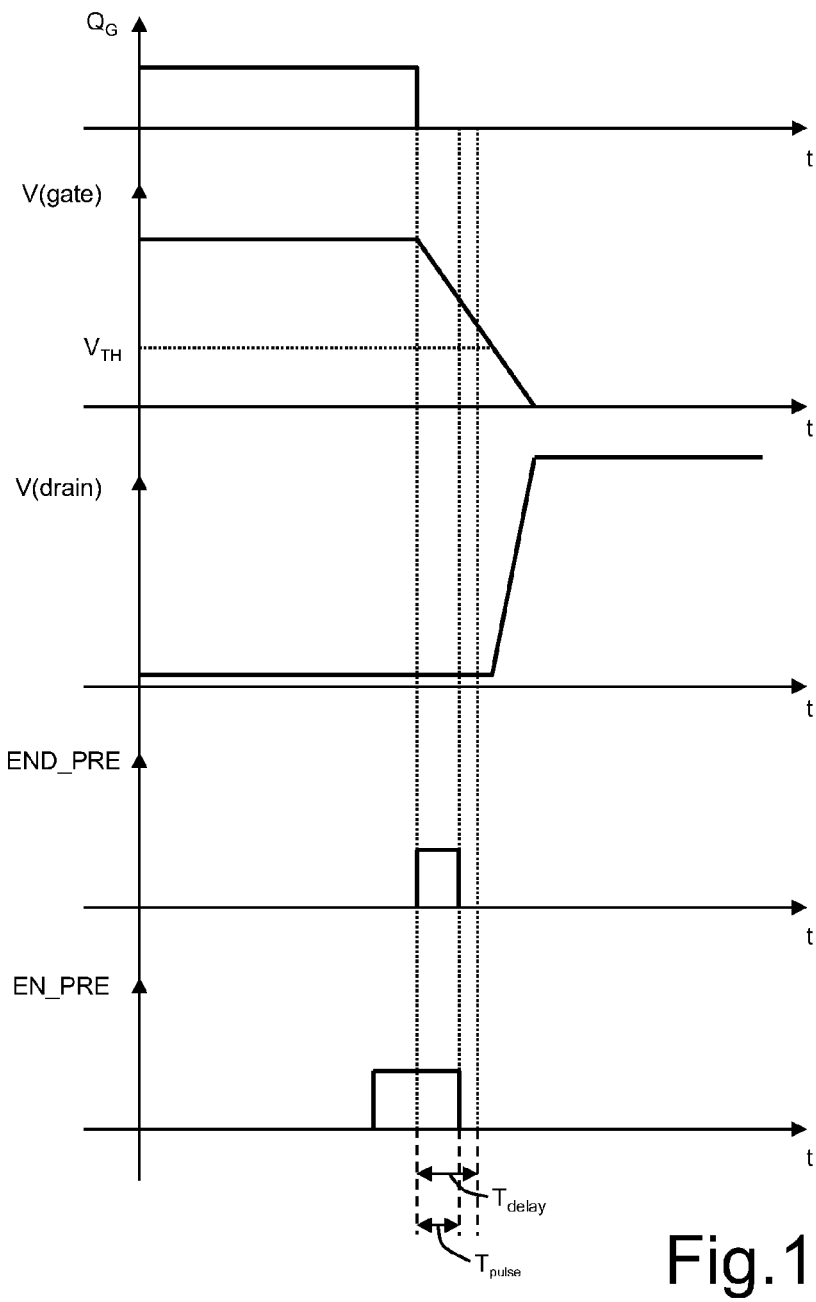
FIG. 13 shows the plots of the signals involved during the precharge step, using the precharge control block of FIG. 12.

As is shown in FIG. 13, the end-of-precharge controller 39''' is configured to generate the end-of-precharge signal END_PRE when the control signal $Q_G$ assumes a low value. In addition, the precharge is stopped (the logic signal EN_PRE is brought to the low value) at the falling edge of the end-of-precharge signal END_PRE.

Figure 14:
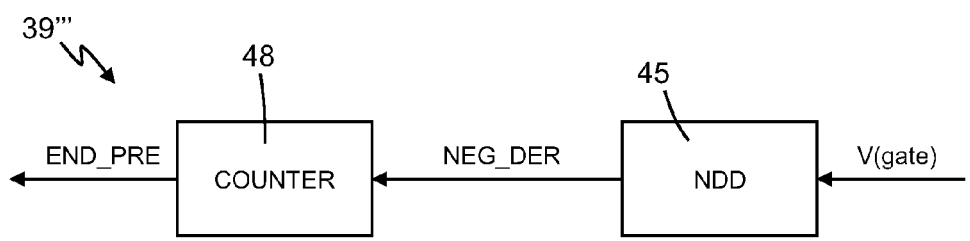
FIG. 14 shows a third embodiment of the precharge control block.

FIG. 14 shows a third embodiment of the end-of-precharge controller, designated by 39''', in the case where the PWM controller 12 drives the main transistor 10 in such a way as to guarantee the so-called "soft-switching". In this embodiment, the end-of-precharge controller 39''' comprises: a negative-derivative detector (NDD) 45, of a known type and not described in detail, which receives on an input thereof the voltage on the gate terminal $V_{(gate)}$ and supplies on an output thereof a negative-derivative signal NEG_DER, as a function of the sign of the derivative of the voltage on the gate terminal; and a counter block 48, which receives at input the negative-derivative signal NEG_DER and supplies on an output thereof the end-of-precharge signal END_PRE.

Figure 15:
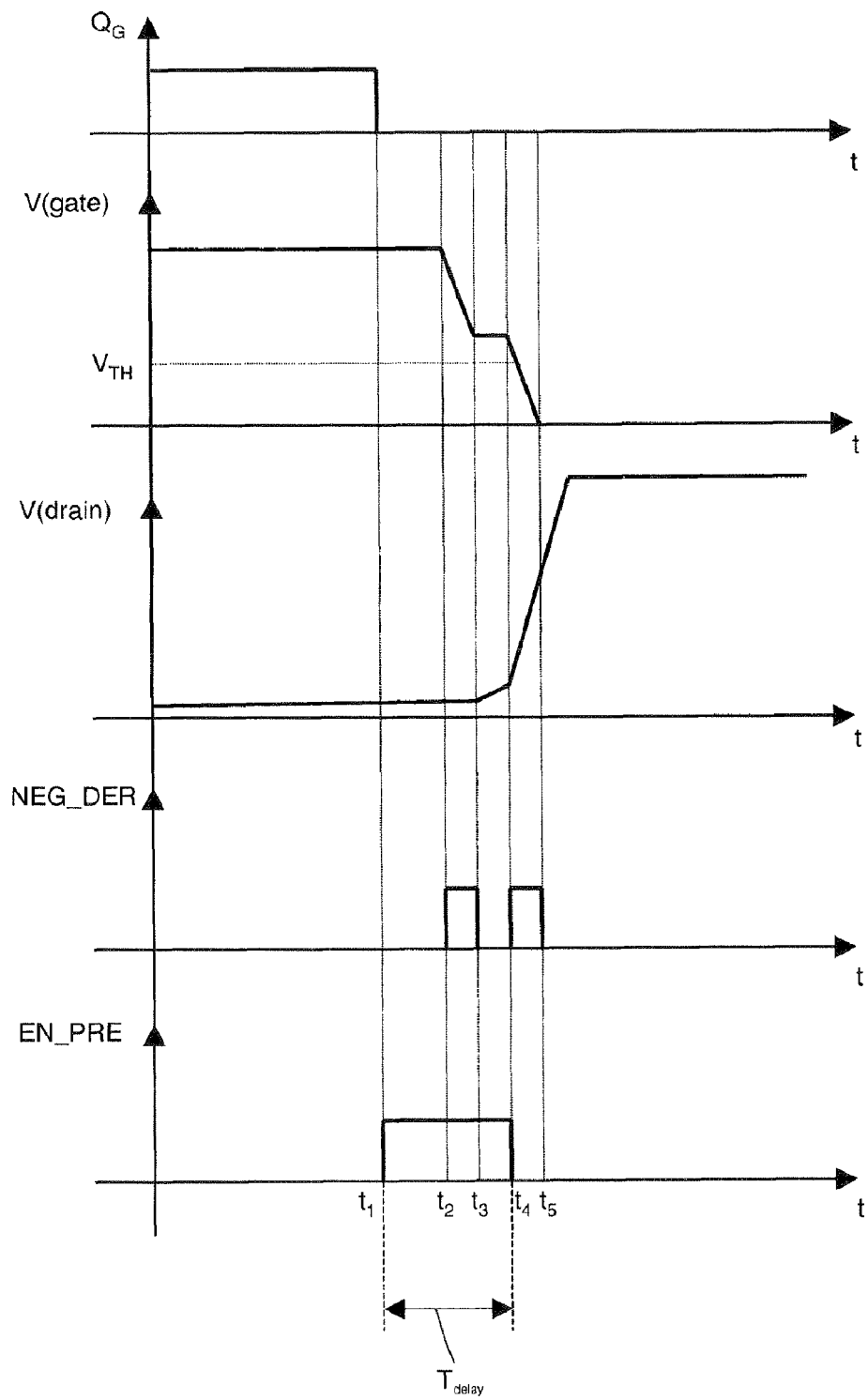
FIG. 15 shows the plots of the signals involved during the precharge step, using the precharge control block of FIG. 14.

In detail, and as is shown in FIG. 15, at an instant $t_1$, the control signal $Q_G$ switches from the high level to the low level, controlling turning-off of the main transistor 10. At the same instant, the logic signal EN_PRE assumes a high value, indicating start of the precharging interval. Next, at an instant $t_2$, the voltage on the gate terminal $V_{(gate)}$ starts to decrease and the negative-derivative signal NEG_DER assumes a high value, indicating that the derivative of the signal has assumed a negative value. At an instant $t_3$, on account of the Miller effect, the voltage on the gate terminal $V_{(gate)}$ assumes a stationary value. Approximately at the same instant of time $t_3$, the negative-derivative signal NEG_DER returns to the low value, and the voltage on the drain terminal $V_{(drain)}$ starts to increase slowly. When the Miller effect terminates (instant of time $t_4$), the voltage on the gate terminal $V_{(gate)}$ starts to decrease again, the voltage on the drain terminal $V_{(drain)}$ increases rapidly, and a new rising edge of the negative-derivative signal NEG_DER determines the end of the precharging interval (the logic signal EN_PRE assumes a low value). In particular, the counter block 48 detects the occurrence of the second pulse generated by the negative-derivative detector 45, and consequently generates the end-of-precharge signal END_PRE.

The above-described embodiments, as well as other embodiments, of a self-supply circuit and method for a voltage converter may allow a number of advantages to be achieved.

In particular, precharging of the gate terminal of the auxiliary transistor 21 that manages the precharging phase enables maximization of the time interval useful for charging the accumulation capacitor 16, so as to guarantee proper self-supply of the controller 12 of the voltage converter 1 without imposing limitations on the duty cycle of the switching signal. In fact, thanks to the preceding precharging phase, following turning-off of the main transistor 10, the auxiliary transistor 21 is already turned on and the current generator 24 can supply the current $I_{charge}$ to the accumulation capacitor 16 without appreciable time delays (after the main transistor is turned off).

Finally, it is clear that modifications and variations can be made to what is described and illustrated herein, without thereby departing from the scope of the present disclosure.

In particular, it is clear that, even though the embodiments have been described with particular reference to a configuration of a flyback type, these other embodiments may be applied in all converters (or regulators, or power supplies) operating in switched-mode (the so-called SMPS—Switch-Mode Power Supply).

In addition, the embodiments described above, as well as other embodiments, may be used irrespective of: the modality of energy transfer between the source and load, at a fixed or variable frequency; the particular circuit solution used for implementing operation of the individual blocks of the control circuit; the type of control switch; and the feedback mode envisaged on the primary side of the transformer.

Furthermore, one or both of $T_{delay}$ and $T_{pulse}$ may extend to or beyond a time when $V_{(gate)}$ of the main transistor 10 equals $V_{TH}$ of the main transistor.

Moreover, some or all of the components in the circuits of FIGS. 1-5, 8, 10, 12, and 14 may be discrete components, disposed on the same integrated circuit (IC) as others of the components, or disposed on ICs that are different from ICs on which others of the components are disposed.

Naturally, in order to satisfy local and specific requirements, a person skilled in the art may apply to the solution described above many modifications and alterations. Particularly, although the present disclosure has been described with a certain degree of particularity with reference to described embodiment(s) thereof, it should be understood that various omissions, substitutions and changes in the form and details as well as other embodiments are possible. Moreover, it is expressly intended that specific elements and/or method steps described in connection with any disclosed embodiment of the disclosure may be incorporated in any other embodiment as a general matter of design choice.

What is claimed is:

1. A self-supply circuit, for a voltage converter having a main switch and a controller, designed to control switching of said main switch for controlling an output voltage, said self-supply circuit comprising:
   a charge accumulator, coupled to said controller and designed to supply a self-supply voltage to said controller;
   a generator, operable to supply a charge current to said charge accumulator; and
   a charge switching circuit, operable to control transfer of said charge current to said charge accumulator, and
   a precharge stage, coupled to said charge switching circuit and configured to carry out precharging of an intrinsic capacitance of said charge switching circuit, before a turning-off transient of said main switch ends;
   wherein said charge switching circuit comprises an auxiliary transistor having a gate terminal coupled to said precharge stage, and a second conduction terminal coupled to said generator, and said precharge stage comprises a precharge controller and precharge switching circuit; said precharge controller being configured to control said precharge switching circuit for supplying said self-supply voltage to said gate terminal during said precharging; and
   wherein said precharge switching circuit comprises a first switch, coupled between said second conduction terminal and a reference potential, and a second switch, coupled between said gate terminal and said charge-accumulator; said precharge controller being designed to close said first switch and second switch during said precharging.

2. The circuit according to claim 1, wherein said precharge switching circuit comprises a third switch, coupled between said gate terminal and said reference potential; said precharge controller being designed to open said first switch and second switch at the end of said precharging.

3. A self-supply circuit, for a voltage converter having a main switch and a controller, designed to control switching of said main switch for controlling an output voltage, said self-supply circuit comprising:
   a charge accumulator, coupled to said controller and designed to supply a self-supply voltage to said controller;
   a generator, operable to supply a charge current to said charge accumulator means; and
   a charge switching circuit, operable to control transfer of said charge current to said charge accumulator means, and
   a precharge stage, coupled to said charge switching circuit and configured to carry out precharging of an intrinsic capacitance of said charge switching circuit, before a turning-off transient of said main switch ends;
   wherein said precharge stage comprises a precharge controller and precharge switching means, and said precharge controller comprises a precharge logic block and an end-of-precharge controller block; said end-of-precharge controller block being configured to generate an end-of-precharge signal, and said precharge logic block being designed to control said precharge switching circuit so as to stop said precharging, when said end-of-precharge signal assumes a given value; and
   wherein said end-of-precharge controller block comprises a comparator device, designed to receive on a first input a reference signal and on a second input a voltage signal present on a control terminal of said main switch, and to generate at output said end-of-precharge signal; said reference signal having a value greater than or equal to a threshold conduction voltage of said main switch.

4. A self-supply circuit, for a voltage converter having a main switch and a controller, designed to control switching of said main switch for controlling an output voltage, said self-supply circuit comprising:
   a charge accumulator, coupled to said controller and designed to supply a self-supply voltage to said controller;
   a generator, operable to supply a charge current to said charge accumulator means; and
   a charge switching circuit, operable to control transfer of said charge current to said charge accumulator means, and
   a precharge stage, coupled to said charge switching circuit and configured to carry out precharging of an intrinsic capacitance of said charge switching circuit, before a turning-off transient of said main switch ends;
   wherein said precharge stage comprises a precharge controller and precharge switching means, and said precharge controller comprises a precharge logic block and an end-of-precharge controller block; said end-of-precharge controller block being configured to generate an end-of-precharge signal, and said precharge logic block being designed to control said precharge switching circuit so as to stop said precharging, when said end-of-precharge signal assumes a given value; and
   wherein said charge switching circuit comprises an auxiliary transistor having a first conduction terminal coupled to a respective conduction terminal of said main switch, and, during said turning-off transient, the voltage of said first conduction terminal undergoes an increase from a first value to a second value; and wherein said controller is designed to control switching of said main switch as a function of a driving signal, and said end-of-precharge controller block comprises a pulse-generator device, which receives at input said driving signal and generates at output said end-of-precharge signal based on said driving signal; said end-of-precharge signal being a pulse having a duration shorter than a time interval comprised between an instant of turning-off of said main switch and an instant of start of said increase.

5. A self-supply circuit, for a voltage converter having a main switch and a controller, designed to control switching of said main switch for controlling an output voltage, said self-supply circuit comprising:
- a charge accumulator, coupled to said controller and designed to supply a self-supply voltage to said controller;
- a generator, operable to supply a charge current to said charge accumulator means; and
- a charge switching circuit, operable to control transfer of said charge current to said charge accumulator means, and
- a precharge stage, coupled to said charge switching circuit and configured to carry out precharging of an intrinsic capacitance of said charge switching circuit, before a turning-off transient of said main switch ends;

wherein said precharge stage comprises a precharge controller and precharge switching means, and said precharge controller comprises a precharge logic block and an end-of-precharge controller block; said end-of-precharge controller block being configured to generate an end-of-precharge signal, and said precharge logic block being designed to control said precharge switching circuit so as to stop said precharging, when said end-of-precharge signal assumes a given value; and wherein said end-of-precharge controller block comprises a derivative-detecting device and a counter device, coupled to said derivative-detecting device; said derivative-detecting device being designed to receive at input a voltage signal present on a control terminal of said main switch and to generate at output a negative-derivative signal in the presence of a decrease of said voltage signal, and said counter device being designed to generate at output said end-of-precharge signal as a function of said negative-derivative signal.

6. A power supply, comprising:
an input node operable to receive an input signal;
an output node operable to provide a supply signal having a supply level;
a first switch coupled between the input and output nodes and including a control node having an associated capacitance;
a controller operable to enable a current to flow through the switch from the input node to the output node while the input signal has a first signal level; and a precharger operable to charge the capacitance while the input signal has a second signal level, a magnitude of the second signal level being less than a magnitude of the first signal level;

wherein:
the precharger comprises a second switch that is coupled between the control node of the first switch and the output node; and
the precharger is operable to charge the capacitance by closing the second switch.

* * * * *